United States Patent [19]

Henderson et al.

[11] Patent Number: 5,044,110
[45] Date of Patent: Sep. 3, 1991

[54] REFLECTIVE LURE

[76] Inventors: Joseph P. Henderson, P.O. Box 8532, Pine Bluff, Ark. 71611; Edward P. Henderson, 2201 State St., Pine Bluff, Ark. 71601

[21] Appl. No.: 575,840

[22] Filed: Aug. 31, 1990

[51] Int. Cl.$^5$ ............................................. A01K 85/00
[52] U.S. Cl. .................. 43/42.33; 43/42.31; 43/42.35
[58] Field of Search ................. 43/42.33, 42.35, 42.31, 43/42.32

[56] References Cited

U.S. PATENT DOCUMENTS

| | | | |
|---|---|---|---|
| 1,249,194 | 12/1917 | Race | 43/42.35 |
| 2,288,595 | 7/1942 | Peterson | 43/42.33 |
| 2,309,521 | 1/1943 | Mabee | 43/42.33 |
| 2,598,360 | 5/1952 | Cummins | 43/42.31 |
| 2,613,471 | 10/1952 | Traycik | 43/42.31 |
| 2,741,864 | 4/1956 | Shotton | 43/42.31 |
| 2,938,294 | 5/1960 | Bachmann | 43/42.33 |
| 3,505,754 | 4/1970 | Lawlor | 43/42.33 |
| 3,879,883 | 4/1975 | Strader | 43/42.32 |
| 4,638,584 | 1/1987 | Lindsay | 43/42.33 |
| 4,956,934 | 9/1990 | Dahl | 43/42.33 |

Primary Examiner—Richard K. Seidel
Assistant Examiner—Chuck Y. Mah
Attorney, Agent, or Firm—Stephen D. Carver

[57] ABSTRACT

A reflective fishing lure provides a changing visual display to attract a fish. An elongated, substantially hollow body mounts one or more hooks. Rigid interior walls subdivide the body into a pair of air-filled end cavities spaced apart by an intermediate, hollow, transparent chamber. The intermediate chamber is substantially filled with a viscous fluid. The fluid suspends a plurality of reflective particles such as glitter and captures an air bubble. The particles are agitated by movement of the fluid and the air bubble within the chamber in response to manipulation of the lure body. The moving particles create the appearance of a changing reflective surface, and thus simulate natural bait action. The stability and responsiveness of the lure to manipulation by the fisherman may vary depending upon the relative volume of fluids and air within the chamber. Various tints may be added to the fluid and various colored particles may be used to create different visual impressions. An alternative embodiment is configured as a reflective spoon for use with fixed line poles.

10 Claims, 2 Drawing Sheets

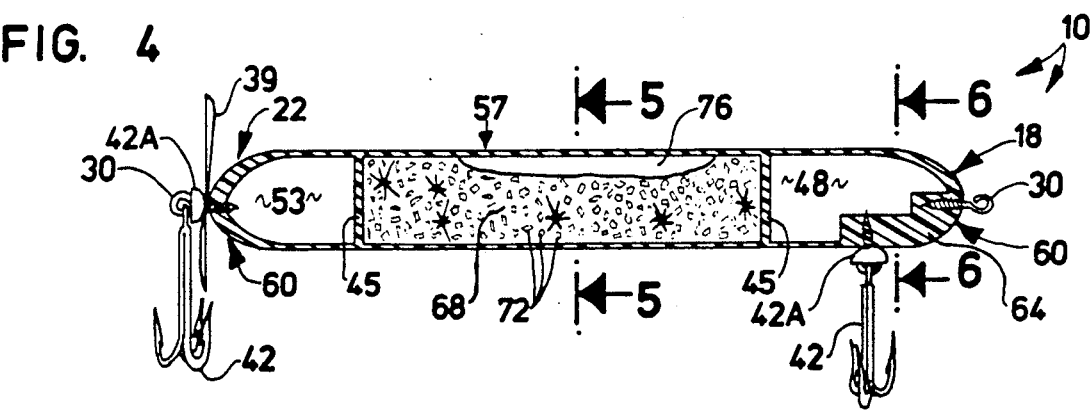
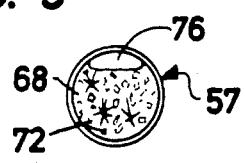
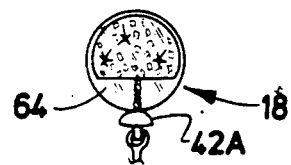
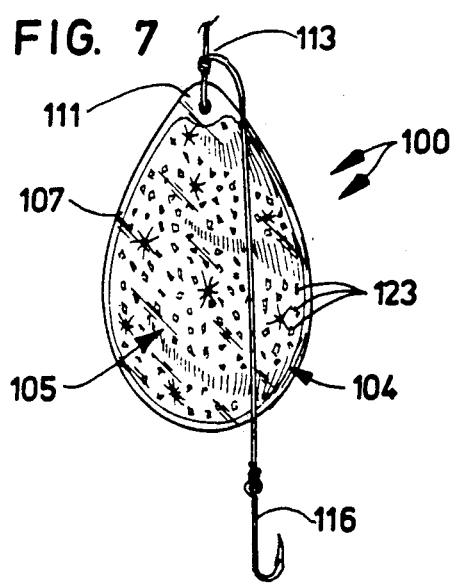

REFLECTIVE LURE

BACKGROUND OF THE INVENTION

The present invention relates generally to fishing lures. More specifically, the present invention relates to a reflective fishing lure which presents a changing visual display as it moves through the water.

It is well known that fish are attracted by artificial lures which simulate the movement and appearance of natural prey. Hence it is desirable to provide a lure which looks substantially like live bait in the water. Moreover, based on our experience, game fish are particularly stimulated by lures which move or change position rapidly to elude capture. Lures which have one or more reflective surfaces have been shown to be particularly effective for capturing game fish.

Numerous ingenious animal-simulative lures have been proposed in the prior art known to us. However, it has proven difficult for lure designers to achieve an artificial lure which provides the appearance of diverse movement at a reasonable cost.

Fishermen who prefer to use cane poles or other fixed-line devices have particular difficulty employing bait-simulative lures designed to be manipulated by a reel. In the prior art known to us, there is no fishing accessory designed for use with such equipment which is capable of presenting a variable visual display to simulate natural movement.

SUMMARY OF THE INVENTION

The present invention generally relates to a reflective fishing lure. The lure preferably comprises an elongated, substantially hollow, transparent body which mounts one or more hooks. The body may assume many forms, and preferably simulates the form of a natural prey such as a shad or minnow.

Rigid, spaced apart interior walls divide the interior of the body into separate end cavities defined at opposite ends of the lure body and a hollow, intermediate chamber. The end cavities are preferably filled with air to provide buoyancy and balance, and the intermediate chamber is substantially filled with a viscous fluid.

The fluid suspends a plurality of reflective particles such as glitter or the like. Preferably, an air bubble is captured by the fluid within the chamber. As the lure is manipulated, the fluid and air bubble move, agitating the reflective particles into motion. Movement of the particles results in variations in the apparent reflective face of the lure. Additionally, as the lure moves, the distribution of weight of the fluid within the chamber changes, and greater or lesser stabilizing effects are provided. Thus, by virtue of its ability to present an ever-changing reflective surface and to constantly vary its position in the water, the present lure more nearly simulates the natural movement of live prey through the water. The lure appears to an attracted fish to move rapidly through the water as a natural prey.

Where desired, particles of different colors may be employed, so that the color of the lure will also change in response to movement of the lure, and the effect of changing appearance is enhanced. The relative volume of fluid and air within the chamber affects the degree of noticeable movement of the particles in response to manipulation of the lure.

In an alternative embodiment, the lure body comprises a spoon, weight, or similar accessory adapted to be used with a cane pole or similar fixed-line device. The accessory is preferably attached to the fishing line near a baited hook. The transparent, hollow lure body is substantially filled with the reflective suspension to present an ever-changing attractive surface as it spins upon the line in the water.

Thus it is a fundamental object of the present invention to provide a lure which simulates natural bait.

A similar basic object of the present invention is to provide a reflective fishing lure.

Another broad object of the present invention is to provide reflective fishing lure which changes in appearance in response to manipulation by a fisherman.

Yet another object of the present invention is to provide a fishing lure having movable ballast to simulate natural movement and provide improved responsiveness to manipulation.

A related object of the present invention is to provide a fishing lure having a liquid-filled body which variably responds to changes in the disposition of the lure.

Another object of the present invention is to provide a fishing lure which appears to vary in shape and/or in color s it moves through the water.

Yet another object of the present invention is to provide a reflective fishing accessory which can be adapted for use with a standard pole or other fixed-line device.

Still another object of the present invention is to provide a reflective fishing lure of the character described which is substantially filled with a liquid-borne, reflective substance such as glitter.

A further object of the present invention is to provide a fishing accessory which varies in appearance to simulate movement of a live bait.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 4 is a longitudinal sectional view thereof;

FIG. 5 is a sectional view taken generally along line 5—5 of FIG. 4;

FIG. 6 is a sectional view taken generally along line 6—6 of FIG. 4; and

FIG. 7 is a perspective view illustrating one alternative embodiment thereof.

DETAILED DESCRIPTION

Figure 1:
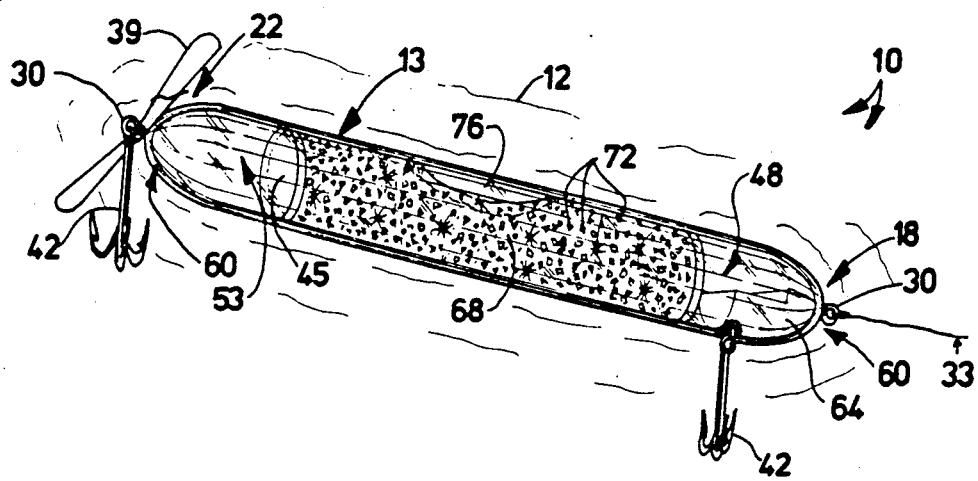
FIG. 1 is a perspective view of the best mode of our new REFLECTIVE LURE in use submerged in water, illustrating a first possible disposition.
Figure 2:
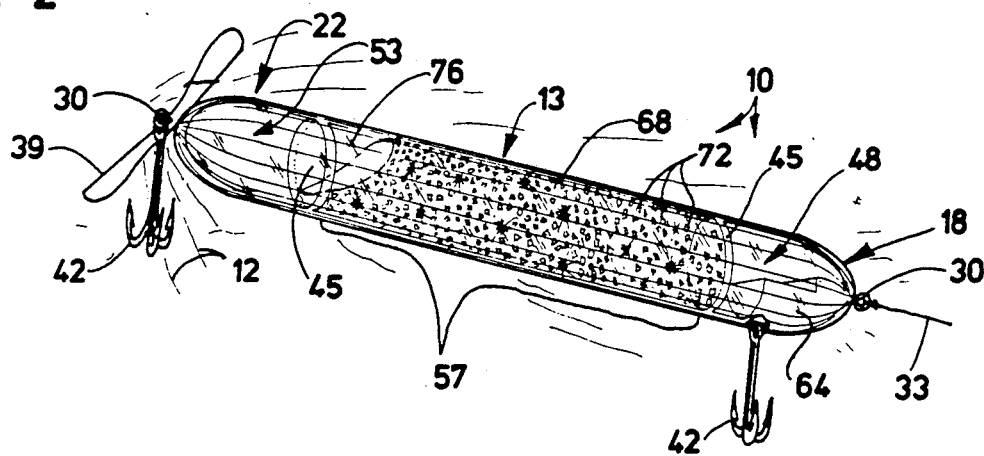
FIG. 2 is a perspective view, illustrating a second possible disposition thereof.
Figure 3:
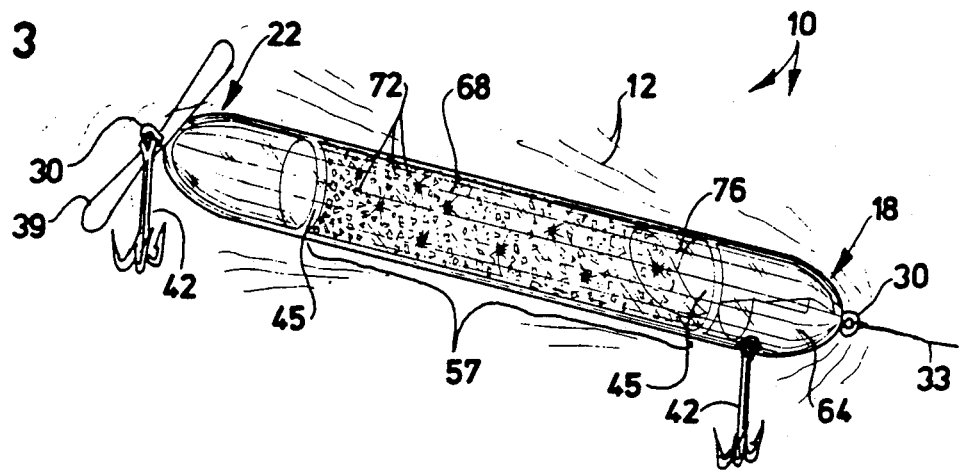
FIG. 3 is a perspective view thereof, illustrating a third possible disposition thereof.

With reference to the appended drawings, the best mode of our new reflective lure, broadly designated by the reference numeral 10, is illustrated in FIGS. 1-3 in use in water 12.

The lure 10 comprises an elongated, rigid body 13 preferably constructed of lightweight, transparent plastic. Body 13 comprises a leading end 18 and a trailing end 22. Ends 18, 22 each terminate in an screw eye 30 or similar fastener. End 18 is preferably coupled to a fishing line 33 controlled by a rod and reel. Trailing end 22 may receive any suitable accessory such as a spinner 39. Preferably one or more hooks 42 are also coupled to body 13.

Lure 10 is illustrated in the form of an elongated, tubular top water float. However, it will be appreciated that body 13 may also be constructed in any desirable configuration. For example, it has proven desirable for bass fishermen to employ a body which simulates the form of a shad or minnow. The body may be modified to simulate a worm, an amphibian or the like.

With additional reference to FIG. 4, at least one pair of rigid, spaced apart interior walls 45 preferably subdivide the interior of body 13 into a leading end cavity 48, a rear end cavity 53, and an intermediate chamber 57. Walls 45 preferably comprise solid, impermeable disks permanently bonded within body 13 to seal chamber 57 from fluid flow communication with end cavities 48, 53. As best viewed in FIGS. 4 and 6, the terminal walls 60 of end cavities 48, 53 are configured of an increased thickness suitable to define a mounting base 64 for eye screws 30 and hook anchors 42A. It will be appreciated that such bases 64 should be of minimum dimensions in order to avoid adding undesirable weight to the lure 10. Of course, where the desired form of the present invention comprises an underwater or diving lure, bases 64 of greater size and weight may be appropriate.

Cavities 48 and 53 are preferably filled with a gas such as air to provide buoyancy and balance to the top water lure 10. Intermediate chamber 57 is substantially filled with a viscous, generally transparent fluid 68. Fluid 68 suspends a plurality of reflective particles 72 such as glitter, aluminum shavings, or similar material which provides the lure body 13 the appearance of a reflective surface. However, as lure 10 moves in the water 12, the suspended particles 72 are agitated and continually change position, thus altering the perceived configuration of the apparent reflective surface. Based on our experimentation, the suspension fluid 68 causes the lure to appear from the viewpoint of a fish beneath the water 12 to move rapidly and continually change position, responding much as would a live bait such as a shad. The apparently active lure is therefore extremely attractive to game fish.

More pronounced agitation of the suspension fluid 68 and particles 72 within chamber 57 may be afforded by an entrapped air bubble 76. If chamber 57 is less than completely filled as shown in FIG. 5, the fluid 68 will flow within the chamber as the lure is moved through the water 12. With specific reference to FIG. 1, lure 10 is shown generally at rest, floating near the water's surface. When the fisherman pulls line 33 suddenly forward by reeling or by deflection of the fishing rod to move the lure through the water, the fluid 68 and particles 72 are displaced within chamber 57. The air bubble 76 moves rapidly between interior walls 45, as illustrated in FIGS. 2 and 3. Movement of the air bubble 76 through fluid 68 substantially agitates the suspended particles 72 and causes changes in the apparent reflective surface of the lure. It will be appreciated that the intensity of particle agitation will vary in relation to the volume of air in bubble 76; a small bubble volume will afford less fluid movement in chamber 57, while a larger air bubble will create a greater stirring effect.

Fluid 68 also affords the further advantage of providing variable ballast for balancing the lure 10. As lure 10 is manipulated by application of tension on line 33, the fluid 68 shifts within chamber 57. Where chamber 57 is substantially filled and air bubble 76 is proportionately small, the volume of fluid 68 will be relatively evenly distributed throughout chamber 57 at all times. Thus fluid 68 will act to quickly stabilize the lure 10 in response to manipulation of line 33.

Contrarily, as the volume of air bubble 76 increases relative to the volume of fluid 76 in chamber 57, the distribution of fluid 68 within the chamber will undergo marked shifts in response to movement of the lure 10. After a sudden tensioning of line 33, air bubble 76 will travel back and forth several times along the length of chamber 57 before the lure comes to a generally level position of rest as viewed in FIG. 1. Such additional movement, together with the continual change of reflective surface, provides additional enticement for a fish. Hence, for fishing under circumstances where it would be desired to employ more dynamic lure action, the fisherman would select a lure having a greater volume of air entrapped in chamber 57.

As indicated, numerous variations in the design of the present invention would be possible. For example, it has proven desirable to tint fluid 68 with colors which either highly contrast with or very nearly approximate the color of the water 12. For example, in clear water, it would be desired to employ a lure which easily blended with the surrounding water. In very murky waters such as would be encountered after a rain, it would be desired to employ a lure having a lighter color fluid in chamber 57 to enhance the reflective effect of the moving particles 72.

Where desired, various immiscible tints may be used in chamber 57, so that agitation of fluid 68 would also result in continual changes in the apparent color of the lure. Such shifts in perceived color creates a visual impression more nearly simulative of a natural bait. For example, a frog swimming across the water's surface will reflect alternatively light and dark colors as its legs move across and away from its belly. Such color changes also cause the lure to appear to be more actively moving. Other variations, such as different animal-simulative configurations of lure body 13, are also appreciably within the scope of the present invention.

The teachings of the instant invention may also be advantageously applied for the fisherman who prefers to use a cane pole or similar fixed-line device. Such fishermen generally do not use artificial lures which must be continually manipulated such as the top water lure of FIGS. 1–6. With reference now directed to FIG. 7, thereshown is an alternative embodiment broadly designated by the reference numeral 100, which is configured similar to a reflective spoon or other accessory commonly used by pole fishermen. The spoon 100 comprises a substantially planar body 104 preferably constructed of a rigid, transparent plastic or the like. Body 104 comprises a hollow interior capsule 105 sealed at its outer edges by a planar, peripheral flange 107. Flange 107 terminates in integral mounting surface 111 which is drilled to receive a fishing line 113 or suitable fastener. In use, spoon 100 is preferably spaced apart from the hook 116 and is adapted to attract fish by virtue of its reflective quality and the noise it creates by its movement relative to line 113. Spoons are typically used in conjunction with live bait, such as worms.

In accordance with the present invention, hollow capsule 105 is substantially filled with a viscous suspension of reflective particles 123 such as glitter or metal shavings. When the line 113 is thrown, selective desired weights will cause the baited hook 116 to sink beneath the water's surface. As the hook 116 descends, body 104 will flutter in response to impacts with the water. As the spoon moves, the suspended particles captured within the capsule 105 will be agitated and create a continually changing reflective display. Even after the hook comes to rest, the spoon 104 will flutter in response to slight movements in the water or changes in water currents Thus, the attractive power of the spoon is greatly enhanced, even though the pole fisherman does not actively manipulate the line 113 as with a reel.

As explained hereinabove, entrapping an air bubble in capsule 105 will result in increased agitation of the suspended particles when the spoon is moved, although the effect will be appreciably less in the narrow capsule. Various color tints and variously colored particles may also be employed to enhance the visual display created by the accessory.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A variable-ballast, visually stimulating reflective fishing lure comprising:
   an elongated generally tubular body having a leading end and a spaced-apart trailing end;
   a pair of rigid walls, internally spaced apart between said leading and said trailing ends;
   a hollow, transparent chamber defined between said walls;
   a pair of hollow air-filled cavities internally defined between said walls and said ends of said body;
   a viscous liquid contained by said chamber;
   a plurality of reflective particles of varying colors and shapes suspended within said liquid;
   a bubble entrapped within said chamber; and,
   wherein manipulation of said body results in movement of said liquid and said bubble to agitate said particles, whereby said particles and said lure visually attracts fish.

2. The lure as defined in claim 1 wherein said body is configured to simulate a natural bait, such as a small fish or amphibian.

3. The lure as defined in claim 1 wherein said body comprises a spoon.

4. A fishing lure comprising:
   an elongated body, said body comprising a leading end and a spaced-apart trailing end;
   a pair of rigid walls spaced apart from said ends;
   a transparent chamber defined between said pair of rigid walls;
   a hollow, air-filled interior cavity defined at each end of said body between said walls and said ends;
   one or more hooks coupled to said body for hooking a fish; and,
   a fluid contained within said chamber, said fluid comprising a plurality of suspended, reflective particles for visually attracting fish.

5. The lure as defined in claim 4 wherein said chamber comprises an air bubble entrapped therewithin.

6. The lure as defined in claim 5 wherein manipulation of said body causes said fluid and said air bubble to move within said chamber and to agitate said particles, thereby visually attracting fish.

7. The lure as defined in claim 6 wherein said particles comprise different colors and shapes for enhanced visual simulation of said fish.

8. The lure as defined in claim 7 wherein said fluid is tinted with one ore more colors for improved visual impact.

9. The lure as defined in claim 7 wherein said body simulates the form of a natural bait, such as a small fish or amphibian.

10. The lure as defined in claim 9 wherein the responsiveness of said lure is increased in proportion to increases in the volume of air of said bubble.

* * * * *